United States Patent [19]
Tai et al.

[11] Patent Number: 6,131,075
[45] Date of Patent: Oct. 10, 2000

[54] LOCOMOTION PLATFORM

[75] Inventors: Chi-Fu Tai, Yung-Ho; Shih-Hsiung Wu, Taipei; Chung-Yun Gau, San-Chung; Hwa-Teng Lee; Choung-Fai Wang, both of Taipei, all of Taiwan

[73] Assignee: Institute of Occupational Safety & Health, Council of Labor Afffairs, Executive Yuan, Taipei, Taiwan

[21] Appl. No.: 09/105,991

[22] Filed: Jun. 29, 1998

[51] Int. Cl.[7] .................................................. G01C 9/00
[52] U.S. Cl. ........................ 702/150; 702/151; 702/152; 702/153; 702/94; 434/11; 434/29; 434/55; 434/247
[58] Field of Search .................................. 702/150–153, 702/94, 95; 434/55, 29, 247, 11

[56] References Cited

U.S. PATENT DOCUMENTS

| | | | |
|---|---|---|---|
| 5,186,270 | 2/1993 | West | 180/6.62 |
| 5,562,572 | 10/1996 | Carmein | 434/247 |
| 5,580,249 | 12/1996 | Jacobsen et al. | 434/11 |
| 5,980,256 | 11/1999 | Carmein | 434/55 |

*Primary Examiner*—Marc S. Hoff
*Assistant Examiner*—Hien Vo
*Attorney, Agent, or Firm*—Bacon & Thomas

[57] ABSTRACT

A locomotion platform is composed of a platform main body, a waist holding device, a signal fetching circuit, and a monitoring system. The platform main body consists of a platform structure body, a perforated platform face plate, position sensors, and balls located over the position sensors. The waist holding device consists of a waist ring for catching the waist of a user, and a fastening member for fastening the waist holding device with the platform structure body. The signal fetching circuit is intended to fetch the signals generated by the position sensors. The monitoring system is intended to receive the output signals of the signal fetching circuit and is provided with a software for computing the displacement generated by the strolling of the user on the platform main body. The results of computation are exhibited on a monitor.

10 Claims, 9 Drawing Sheets

LOCOMOTION PLATFORM

FIELD OF THE INVENTION

The present invention relates to a locomotion platform consisting of a rolling ball platform.

BACKGROUND OF THE INVENTION

The overhead crane is widely used as a carrying tool in the machine manufacturing sector and is composed of an I-beam as its main structural body, which is driven by an alternating current motor to travel along a fixed rail and is provided with a hooked portion having a motor-driven hoisting mechanism for moving articles. The occupational accidents involving the operation of the overhead crane often result from the lack of familiarity with operational procedures on the part of the overhead crane operator. In other words, the occupational safety can be enhanced by a training program in which the operators of the overhead crane are trained to operate the overhead crane by means of an overhead crane simulator. The overhead crane simulator is capable of duplicating artificially the conditions likely to be encountered with by the operator in the course of actual operation of the overhead crane. In addition, the operators are taught to develop an ability to avert the accidents and to cope with the operational problems.

The fixed overhead crane simulator must be used in conjunction with a locomotion platform for the trainee to stroll thereon. The conventional locomotion platform simulator was disclosed in IEEE Proceedings of VRAIS, 1996, pp 60–65. It is not effective and is therefore not well accpeted. In other words, there is no workable locomotion platform available in the market place today.

As far as the simulation technology is concerned, the research and the development of the fixed overhead crane simulator are not much different from those of the movable overhead crane simulator. The operator must stroll on the locomotion platform to operate the overhead crane, thereby involving a number of problems as to the interface of machine and operator, as well as the walking pattern. In the practical operation of the overhead crane or in the license test of the overhead crane operation, the operator is required to walk along a closed path. For this reason, the two dimensional planar motion is the most important element that must be taken into consideration in designing a locomotion platform.

In addition, the more important thing is to design an interface circuit of high speed communication to attain the transmission of the walking data. The variation in the visual landscape and the interactive relationship are completed via changing the control parameters based on the computation of the walking data.

As fas as the movable overhead crane simulation training system, the fixed overhead crane simulation training system, or any other type of simulation training system is concerned, the simulation technology is the development guideline. It is therefore necessary to have a strong interactive relationship to achieve the effect of simulation. As shown in the following table, when the screen redrawing rate 60 frames per second, the response time is so prolonged as to delay the completion of the frame redrawing in light of the cumbersome mathematical calculation of the simulation software and the data inputting/outputting. As a result, the frame redrawing rate is reduced to result in the interruption in the simulative landscape, which leads to a distortion of the actual landscape.

| Sampling | Communication | Processing | Redaw |
|---|---|---|---|
| 16.7 ms (60 Frame/sec) | | | |

The above table is indicative of the fact that the frame redrawing rate of 60 frames per second can be attained only when the signal detection, the signal transmission, the computer memory, and the display device are effectively improved. For this reason, the efforts were made by the inventors of the present invention on the research of the high speed communication interface under the virtual circumstance, by using 10 ms as the signal redrawing rate of the locomotion platform.

The main functions of the locomotion platform of the present invention are as follows:

1. attaining the two dimensional planar motion within an effective area.
2. The operator is not required to wear any device except helmet.
3. The facilities can be safely used by the operator without using both hands.
4. The platform is capable of reacting instantly to the walking signal of the operator.
5. The redraw rate of the signal of the locomotion platform is 10 ms.
6. The operator can engage in two dimensional walking motion of 360 degrees.

SUMMARY OF THE INVENTION

The objective of the present invention is to provide a virtual locomotion platform.

Another objective of the present invention is to provide a locomotion platform enabling a user thereof to engage in the 360-degree two dimensional walking motion within an effective area.

It is still another objective of the present invention to provide a locomotion platform which is composed of a main body, a waist holding device, a signal fetching circuit, and a monitor system.

DETAILED DESCRIPTION OF THE INVENTION

The locomotion platform of the present invention comprises a platform main body, a waist holding device, a signal fetching circuit, and a monitor system.

The platform main body is formed of a platform structure body, a perforated platform face plate, position sensors, and balls. The perforated platform face plate is mounted on the structure body such that the position sensor and the ball are located in the holes of the perforated platform face plate, and that the balls are located over the position sensors. The waist holding device is composed of a waist ring and a fastening member which is fastened with the platform structure body. The waist ring is intended to catch the waist of a user. The signal fetching circuit is used to fetch the position signal generated by the position sensor of the platform main body. The monitor system is intended to receive the position signal transmitted by the signal fetching circuit and is provided with a software for computing the displacement of the user on the platform main body such that the result of the computation is shown on a monitor.

The ball-type locomotion platform of the present invention is an important segment of the overhead crane training simulation system. The waist holding device is capable of holding the user such that the user is prevented from tripping while walking on the platform main body. The platform is provided thereon with nine plates which are provided with 256 balls arranged in array of 16*16. The simulation training is attained by the platform in conjunction with the virtual facts. The up-and-down adjustment of the waist holding device is done mechanically, whereas the front and the rear inflatable adjustment is suitable for the users of various body figures. In the course of the concept design, the entire locomotion platform is divided into the concept design as of the ball platform, the waist holding device, the signal fetching circuit, and the monitor software.

The ball platform is mainly intended to provide two dimensional motion and to mount thereon a walking data sensing element. The waist holding device is intended to give a support to the user such that the user does not trip, and that an action force in reverse is provided to enable the user to maintain a steady motion on the platform. The signal fetching circuit is intended to provide a fast signal processing circuit so as to bring about the high speed communication between the platform and the monitor computer. The monitor software is the combination of the walking speed operation of the fuzzy logic mathematics and the hand shaking communication of the signal between the monitor computer and the SGI work station.

The main function of the locomotion platform is to provide its user with the two-dimensional motion and to detect the position of its user. The moving speed of the user is computed on the basis of the moving stroke and direction which are converted from the user's position by the computer program and are used as redraw parameters of the virtual software.

The function of the two-dimensional motion is to enable the user to attain the horizontal motion and the longitudinal motion. As a result, the main design concept is analogic to the computer mouse. The relative motions of the horizontal displacement and the longitudinal displacement are therefore attained by the horizontal rocking and the longitudinal rocking of the pure rolling of the balls which are appropriately constrained by the sleeves.

Figure 3:
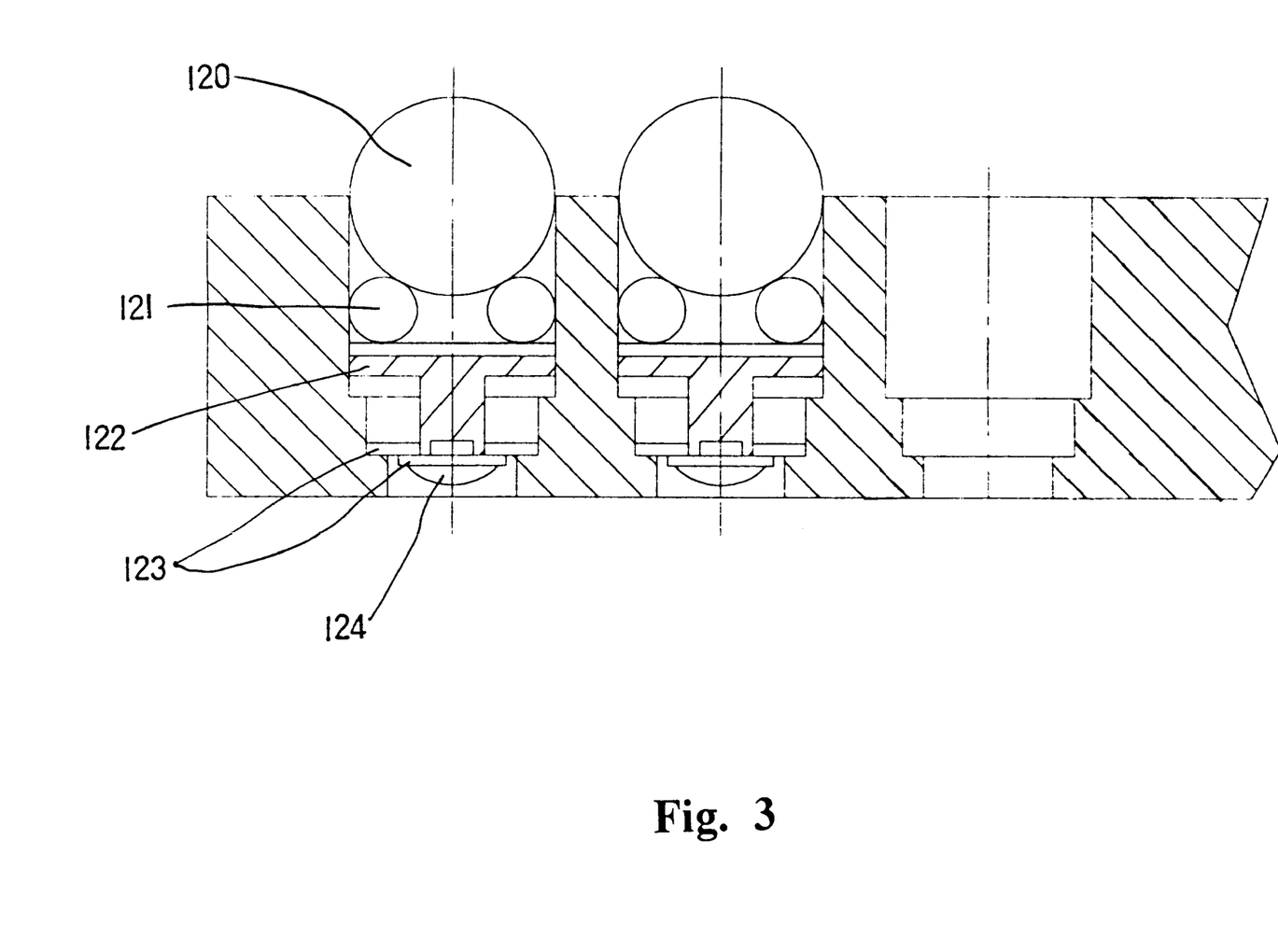
FIG. 3 shows a schematic view of a position sensor and a perforated face plate of the locomotion platform of the preferred embodiment of the resent invention.

On the other hand, the position sensors are located under the balls, as shown in FIG. 3, such that the balls are allowed to have 2mm of degree of freedom of motion. As the balls are under the pressure of the feet in motion, the sensors are triggered by the balls to transmit the signal.

The main function of the waist holding device is to provide its user with a stable support to prevent the user from tripping, and with an action force in reverse for enabling the user to maintain a steady motion on the platform. The waist holding device is provided with a waist deflection angle sensor for estimating the direction of motion with precision. As a result, the function of the waist holding device is two-fold: physical support and sensing of deflection angle.

The waist holding device of the present invention is similar in construction to the conventional wait holding device and is generally divided into two categories, which are the hinge-type waist holding device and the up-and-down movable waist holding device. The hinge-type waist holding device is provided with air sacs for adjusting comfortably at the position of the user's waist, and with a base which is hinged to the platform structure body. The user can enter the waist holding device by opening the movable portions. Upon having entered the device via the opening of the movable portions of the device, the movable portions are closed. The sequential orders in which the waist holding device is used are as follows:

opening hinge→entering the waist holding device→closing hinge→inflating air sacs→beginning of the test.

The design concept of the hinge-type waist holding device of the present invention accentuates the characteristic that the device can be used with ease. However, the hinge-type waist holding device is not equipped to provide the height adjustment in accordance with the user's height.

The up-and-down movable waist holding device is capable of affording a physical support and a deflection angle sensing, and is provided with air sacs as interfaces between man and machine. The position adjustment of the user is attained by inflating the air sacs. The deflection angle sensing is attained by the angle coding device and the time-rule belt.

The greatest difference of the hinge-type waist holding device is the employment of the integrally-made circular rail which can be adjusted in height by an electrically-driven device, so as to promote the system rigidity, the operational smoothness, and the easy adjustment. The waist holding device is ordinarily located over the balls. As the user enters the waist holding device, which is then lifted to locate at a level in accordance with the height of the user. Upon completion of inflating the air sacs, the waist holding device is ready to work. The sequential orders of using the hinge-type waist holding device are as follows:

entering the device→lifting the device to locate at a desired level→fastening the height adjustment→inflating the air sacs→beginning the test.

| Design Concept Comparisons of waist holding device | | |
| --- | --- | --- |
| Concept | hinge-type device | up-and-down movalbe type |
| locating method | inflatable air sacs | inflatable air sacs |
| operational smoothness | hinged portion vulnerable to jamming | smooth |

| -continued | | |
|---|---|---|
| Design Concept Comparisons of waist holding device | | |
| height adjustment | none | electrically-driven adjustment |
| 360-degree position sensing | time-rule belt | time-rule belt |

On the basis of the above comparisons, it is readily apparent that the up-and-down type of waist holding device is used preferably in the present invention in light of its smooth operation.

The motion speed can be accurately calculated only at the time when the locomotion platform has arrived at a certain analytic degree, in conjunction with the virtual software. In order to make the present invention friendly to the user, the special emphasis is placed on the man-machine interface design by joining the sensor system with the hardware platform. As a result, the users are not required to wear the special boots or gloves so as to reduce the psychological burden of the users and to enhance the effect of the virtual training.

In order to meet the client's requirements, the platform is provided therein with a plurality of sensors for increasing the I/O channels. In the meantime, the frame redrawing rate must be higher than 60/sec so as to attain the reliability of the virtual landscape. On the basis of 60/sec, the chores of the position sensing, the signal fetching, the signal communication, and the operation of the redraw data must be completed in each 16.7 ms.

As far as the overhead crane simulator is concerned, the most effective solution is to improve the mode of the sensing and the transmitting of the displacement data of the ball-type locomotion platform. Generally speaking, there are three kinds of solution: direct access method, scanning method, and multiplexer.

In the direct access method, each sensor is connected with a set of the fixed communication channel. As a result, the state of each sensor can be checked by a periodic inspection of the output state of each communication channel by means of the program interrupt. The direct access method employs a reasoning method for finding the solution to the problem. The reasoning method is deemed most pertinent. However, as the system becomes so large as to contain 1024 communication channels, the hardware structure becomes complicated.

The scanning circuit is most commonly used in the input of a large amount of serial data. A computer keyboard is a case in point. The principle of the scanning circuit is based on the matrix by which all sensors are arranged such that the state of the sensors is inspected by each signal transmitting and each signal receiving.

The interface circuit of the ball-type locomotion platform consists of 576 position sensors. The problem of the hardware line complication can be resolved by the arrangement in array of 24×24 in conjunction with 8255 interface cards of 48 communication channels such that 24 communication channels are designated as output, and that 24 communication channels are designated as input. The scanning circuit is further characterized in that it receives only the serial data. As a result, the scanning circuit is incapable of inspecting the state of all sensors in the same row at the time when the sensors of the same row have simultaneously one or more states that have been changed. The scanning circuit can therefore detect only the state that is changed earliest such a situation as described above can cause the operational error.

The multiplexer is mainly intended for selecting one input line among a plurality of input lines such that the data of the selected input line are transmitted to the only output line. The designation of the input line is controlled by the selection input.

The waist holding device of the present invention is composed of the scanning method and the multiplexer for achieving the frame redrawing rate at 60/sec, even 100/sec.

For further description of the present invention, please refer to the following description of the preferred embodiment with reference to the accompanying drawings.

Figure 1:
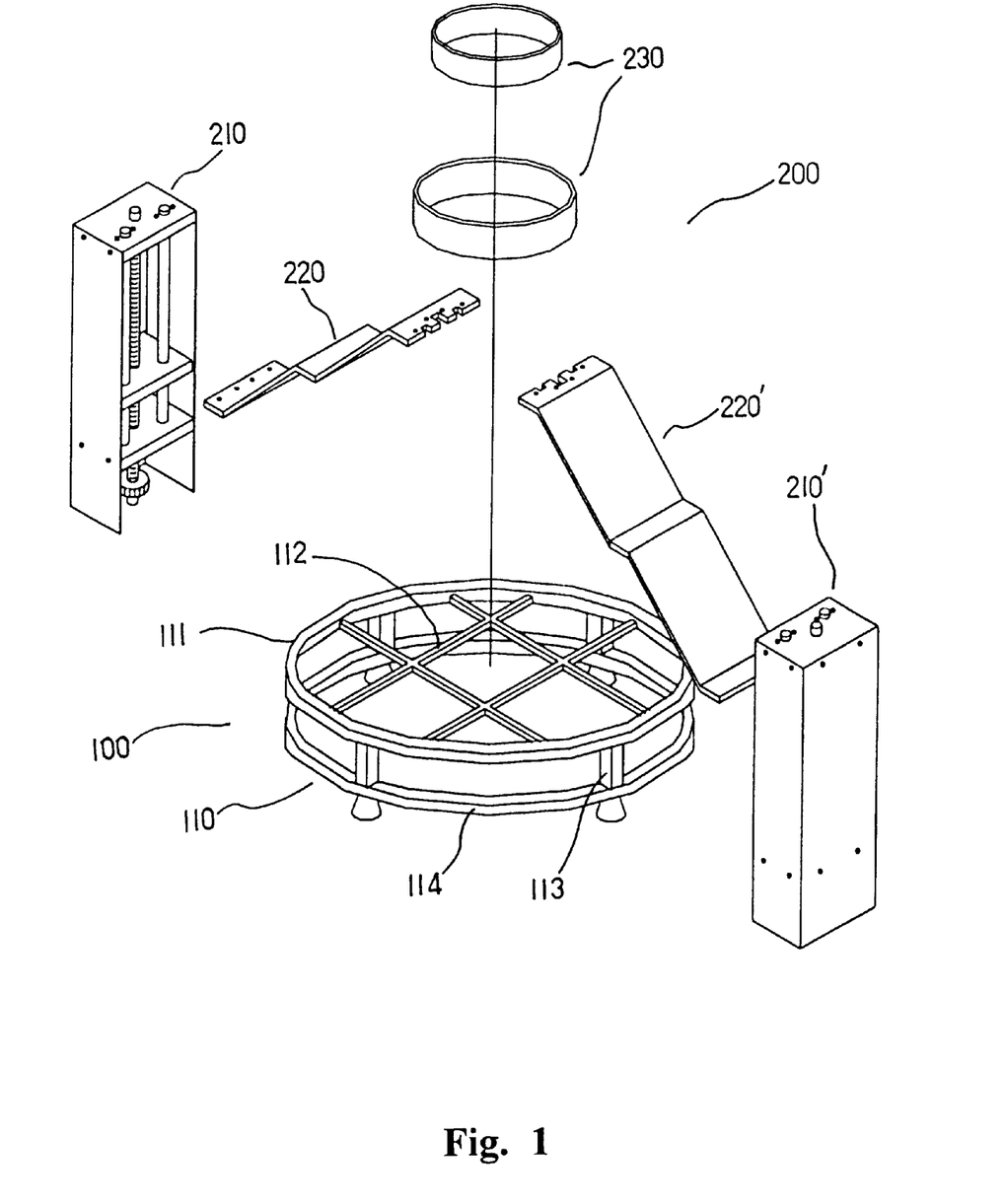
FIG. 1 shows a partial exploded view of a locomotion platform of a preferred embodiment of the present invention.

As shown in FIG. 1, a waist holding device 200 is of a rail-type (up-and-down) construction. The platform main body 100 comprises a platform structure body 110 which is formed of a steel frame upper ring 111, an upper steel frame 112, a side steel frame 113, and a steel frame lower ring 114. The waist holding device 200 comprises the height adjusting portions 210 (210'), support frames 220 (220'), and a swiveling ring 230 which consists of an outer ring 231 and an inner ring 232.

Figure 2:
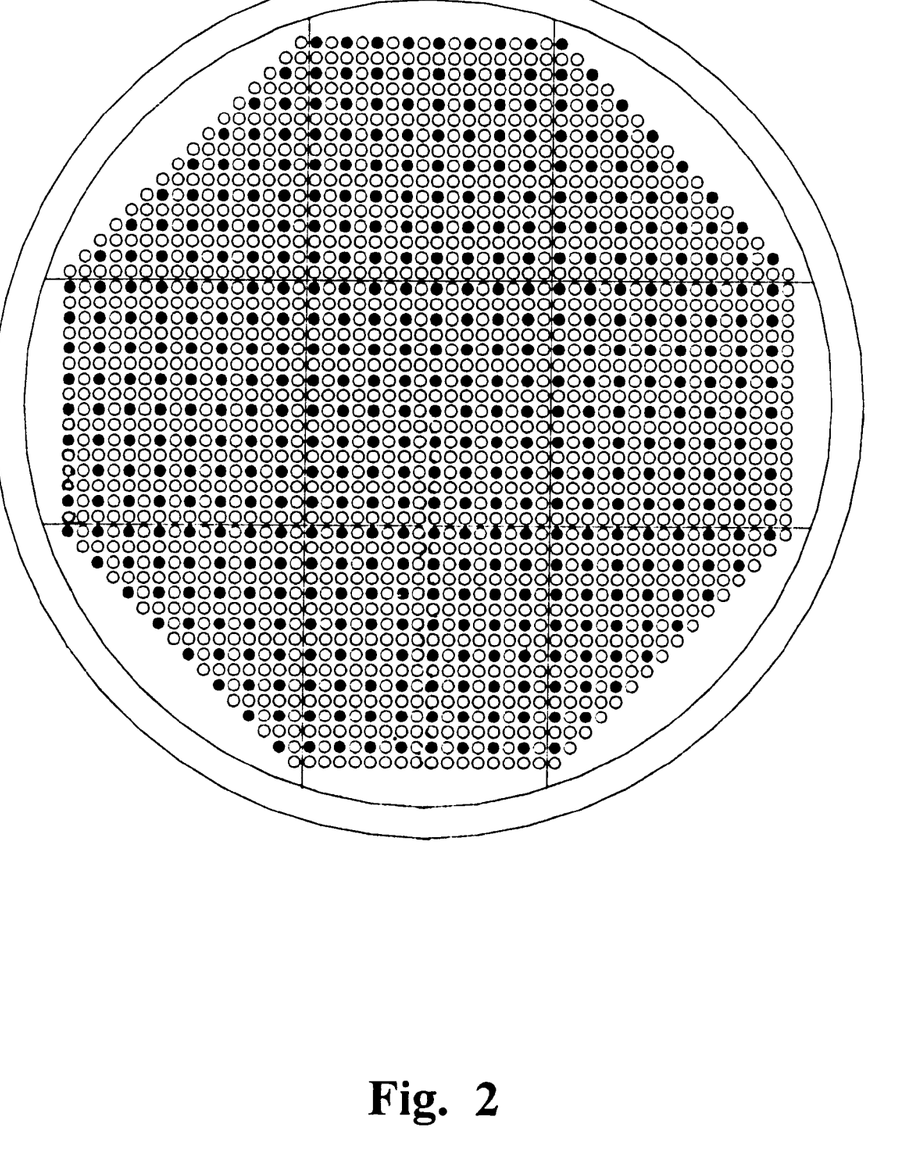
FIG. 2 shows a top view of a main body of the locomotion platform of the preferred embodiment of the present invention.

The platform main body 100 further comprises a ball platform, as shown in FIG. 2. The ball platform consists of a face plate which is made of an aluminum alloy and is mounted on the upper surface of the platform main body 100. A round plate is formed of 9 plates which are laid one by one on the upper steel frame 112 of the platform structure body 110 of the platform main body 100. In FIG. 2, the white circle denotes the ball without the position sensor, whereas the black dots denote the ball with the position sensor being located under the ball.

Figure 5:
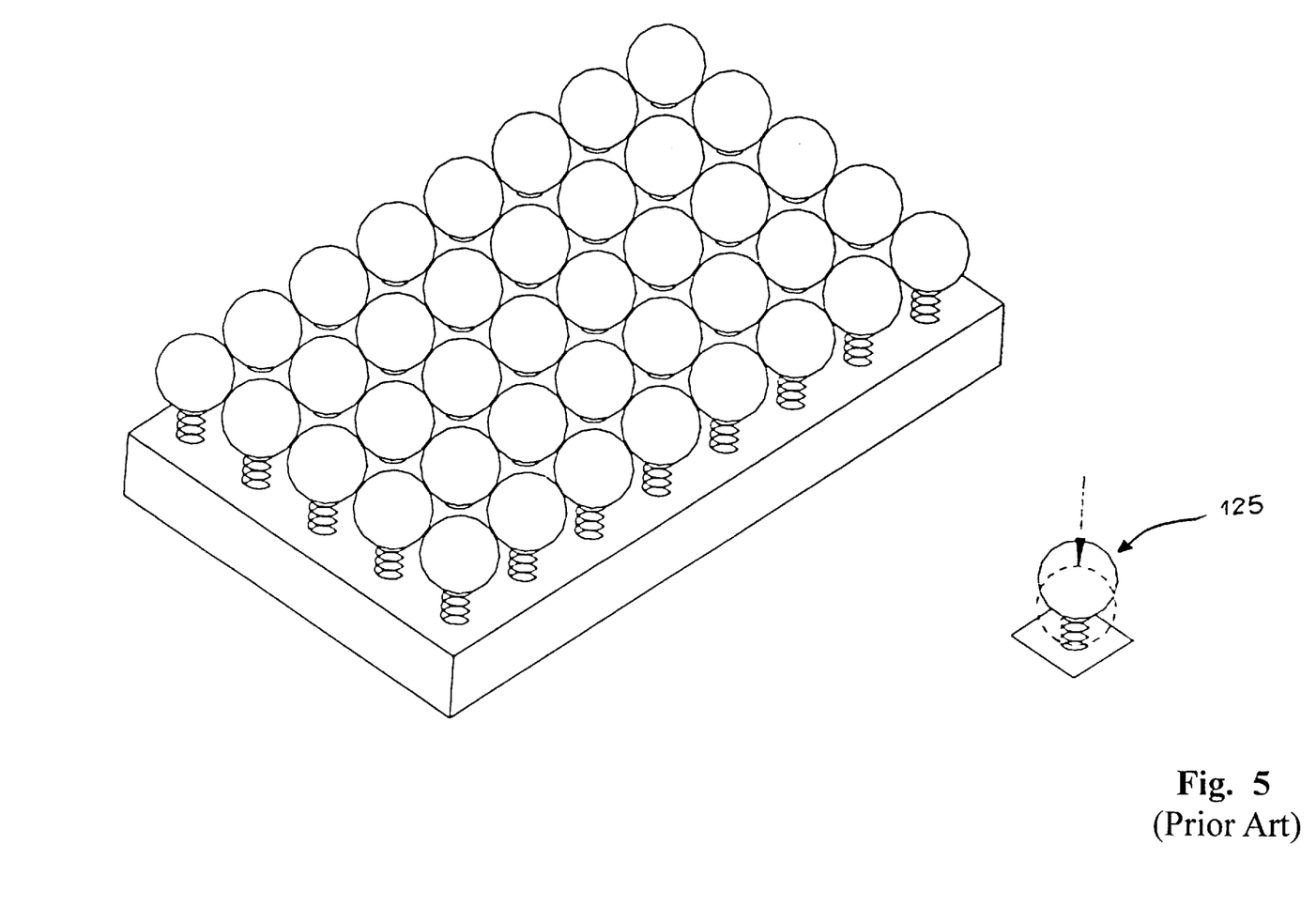
FIG. 5 shows a schematic view of conventional a position sensor of the main body of the locomotion platform.

As shown in FIG. 3, the position sensor consists of a large steel ball 120, a plurality of small steel balls 121, an insulated spindle 122, two pads 123, and a screw 124 for fastening the position sensor with the ball platform. The position sensor of the present invention is different from the conventional position sensor 125 shown in FIG. 5. The arrow shown in FIG. 5 denotes the direction in which the bail is exerted on by the pressure of the user's feet.

Figure 6:
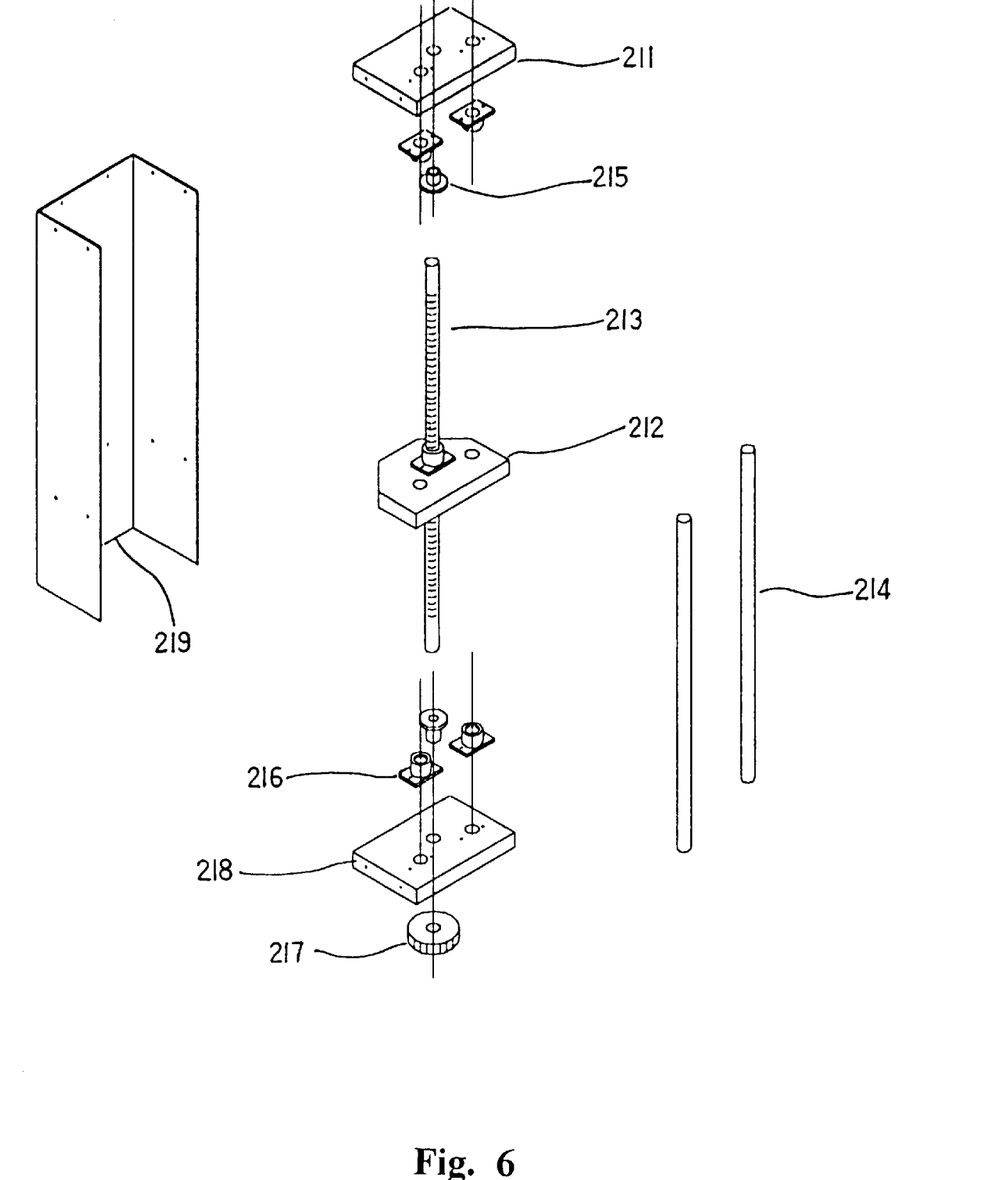
FIG. 6 shows an exploded view of a height adjusting portion of the preferred embodiment of the present invention.
Figure 7:
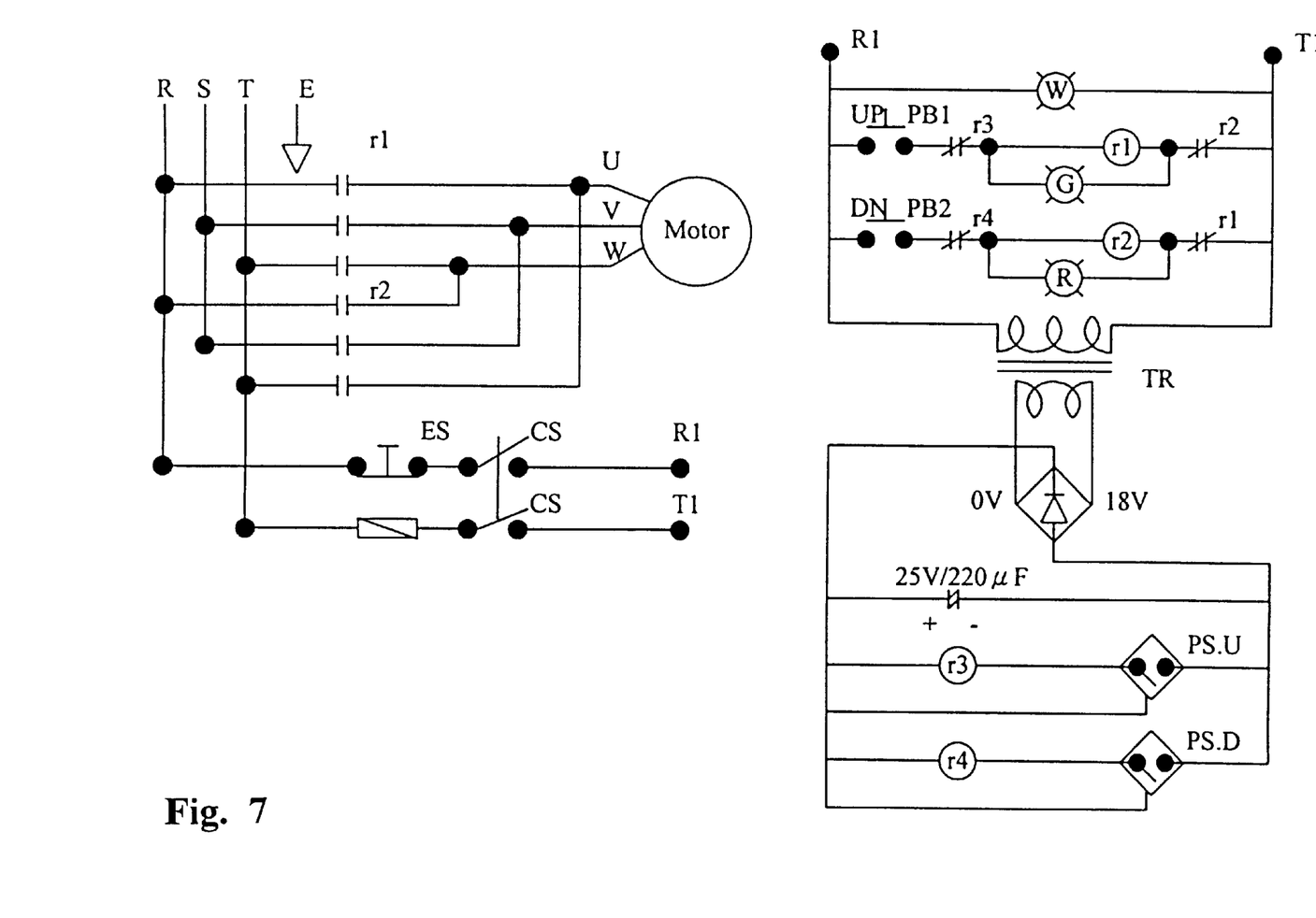
FIG. 7 shows an electric motor control circuit.

As shown in FIG. 6, the height adjusting portion 210 consists of an upper fastening cover plate 211, a slide seat plate 212, a power threaded rod 213, two guide rods 214, two power threaded rod collars 215 located at the end of the power threaded rod 213, four straight line bearings 216, a toothed belted wheel 217, a lower fastening cover plate 218, and a housing 219. The height adjusting portion 210 is driven by a stepless electric driving device, which is in fact an electric motor having a control circuit for controlling the height adjusting portion 210, as shown in FIG. 7, in which ES, CS, PB, PS, TR denote respectively an emergency stop switch, a power source switch, an ascending/descending switch, an ultimate position proximity switch and 220/18V transformer, and in which R, S, T and E denote 220V three-phase four lines.

When the power source switch CS is connected, the white indicating lamp W is turned on. In the meantime, when the ascending switch UP is pressed, the forward relay r1 is actuated to cause the motor to operate. The green steering indicating lamp G is also activated at this time. When the waist holding device is lifted to arrive at the ultimate height, the upper ultimate proximity switch PSU is triggered such that the relay r3 is actuated to interrupt the power supply so as to stop the motor in operation. The control flow of the reverse motion of the motor is the same as described above. In order to safeguard the user, the ascending loop and the descending loop are provided with an interlocking circuit.

Figure 8:
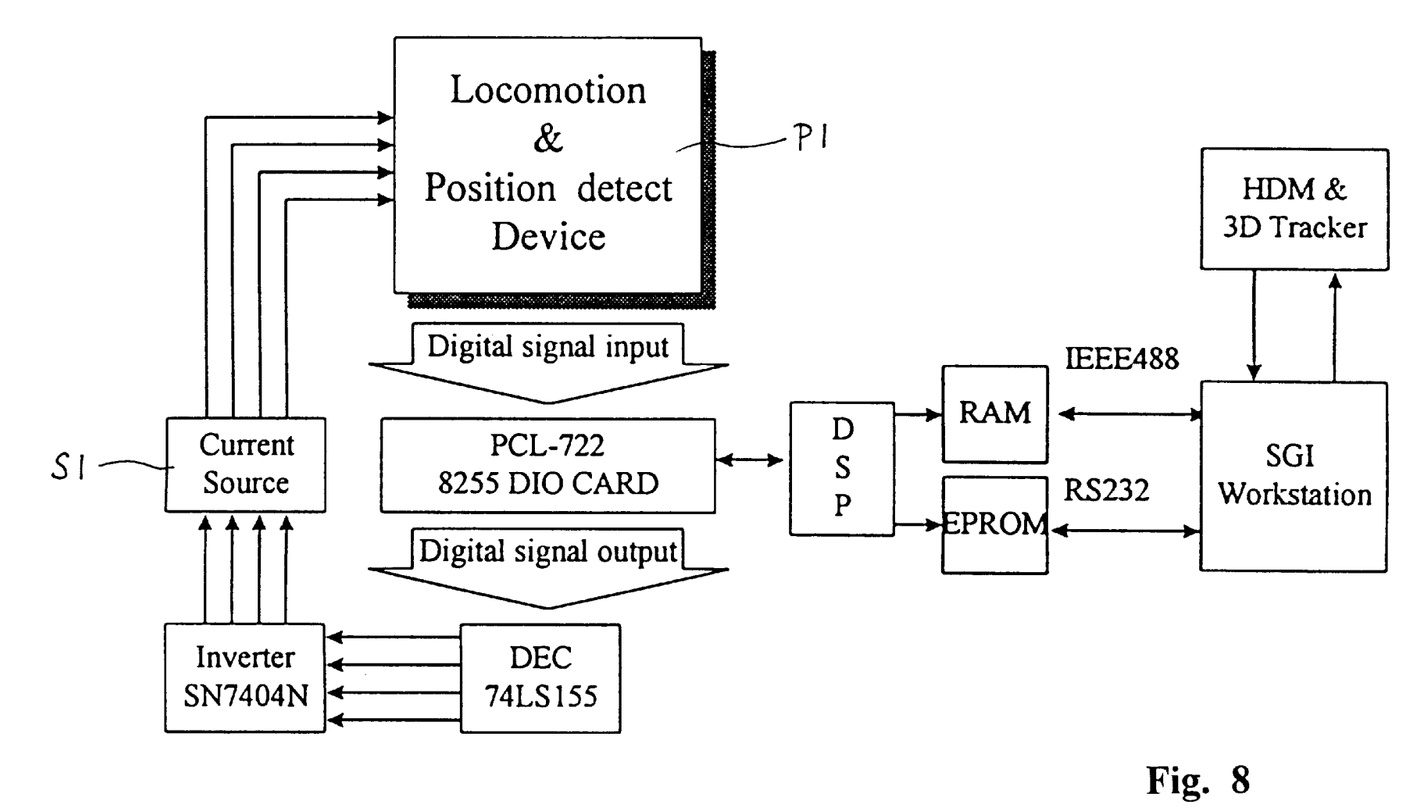
FIG. 8 shows a schematic view of layout of a platform signal fetching-transmission circuit system of the locomotion platform of the present invention.
Figure 9:
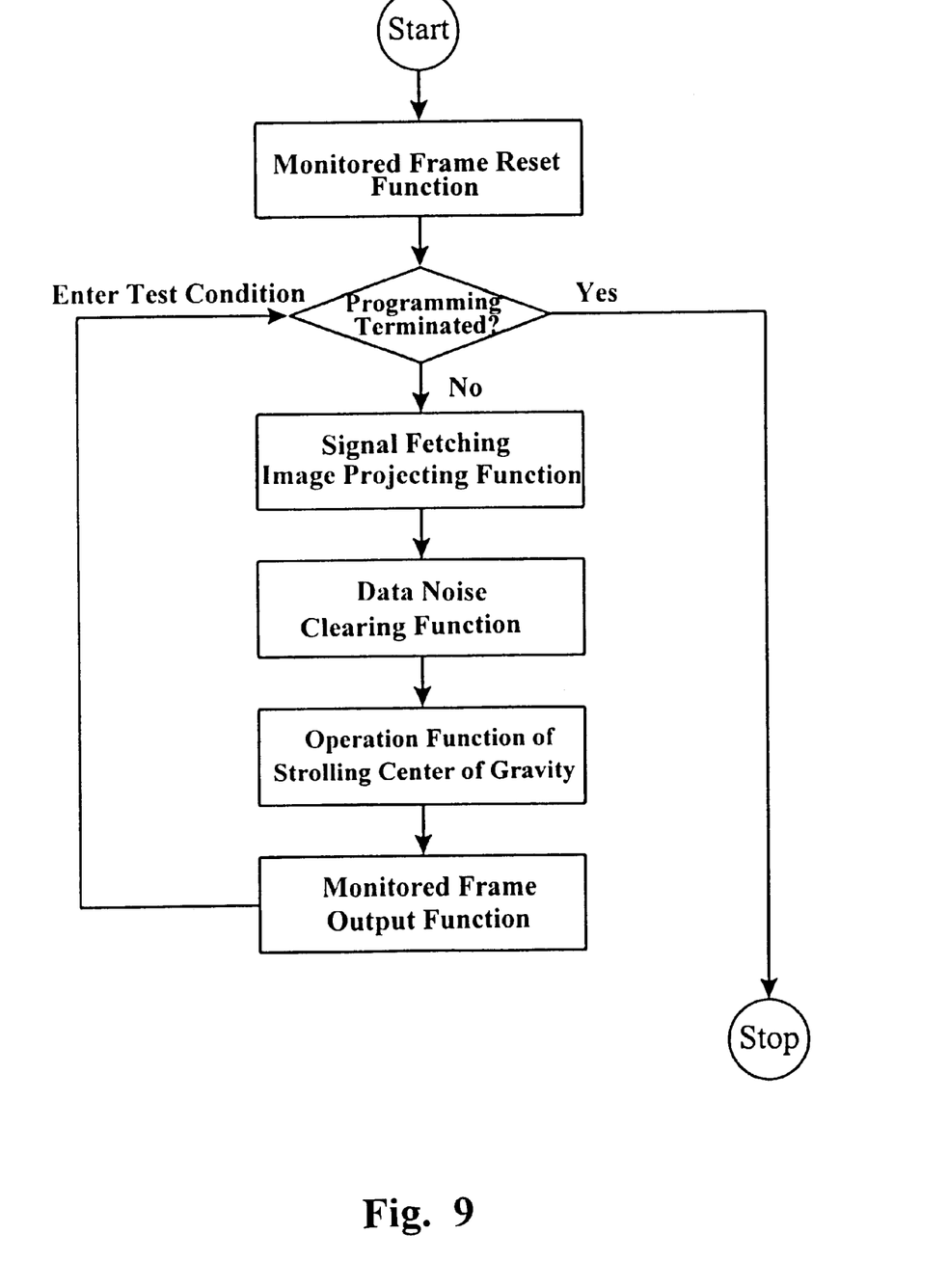
FIG. 9 shows a flow chart of a control/sensing program of the present invention.

In FIG. 8, P1 denotes the position sensor and the height adjusting portion of the locomotion platform of the present invention. PCL-722 denotes the digital input/output interface card for transmitting the strolling data (obtained by the position sensor), the waist protective ring deflection angle data (obtained by the height adjusting portion), and the crane control signal to the monitoring computer from which the data are transmitted to the SGI graphic work station through the program, the digital signal processing and the network system. In conjunction with the head-mounted display and the electromagnetic wave tracker, the image is instantly redrawn. In FIG. 8, s1 denotes current source; 74LS155, 1–8 demultiplexer; and SN7404N, inverter for providing sufficient power source (DC7V).

The locomotion platform of the present invention can be applied not only to the overhead crane simulator but also to the virtual system, such as recreation facilities, exercise devices, rehabilitation devices, etc.

Figure 4:
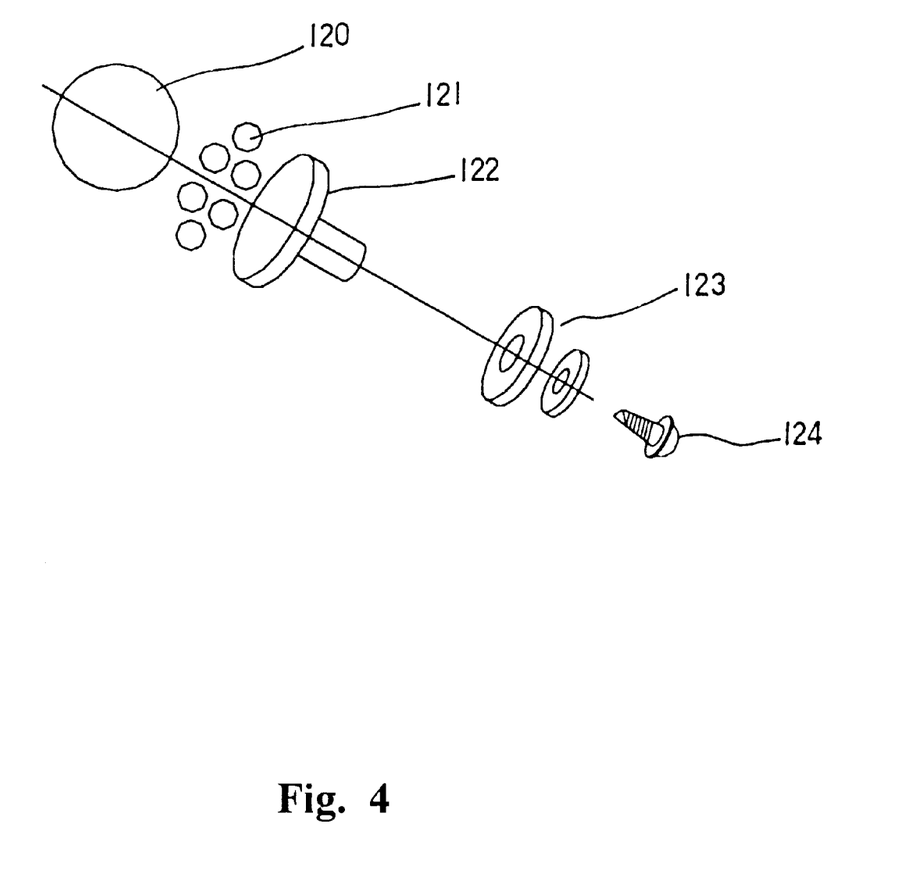
FIG. 4 shows an exploded view of the position sensor of the locomotion platform of the preferred embodiment of the present invention.

The position sensor of the present invention is preferably constructed as shown in FIGS. 3 and 4.

The waist holding device of the present invention may be a conventional waist holding device, preferably the rail-type waist holding device. The waist protective ring may be provided with an angular displacement sensor for measuring the swing angle of the waist.

The display device of the present invention is a conventional display device, such as monitor, LED, HMD, etc.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A locomotion platform comprising:

a platform main body composed of a platform structure body, a perforated platform face plate, position sensors, and balls, said perforated platform face plate being mounted on an upper surface of said platform structure body, said position sensors and said balls being located in holes of said perforated platform face plate such that said balls are located over said position sensor:

a waist holding device consisting of a waist ring and a fastening member for fastening said platform structure body of said platform main body with said waist holding device, said waist ring intended to catch the waist of a user;

a signal fetching circuit having a signal fetching end which is connected with said position sensors of said platform main body for fetching signals generated by said position sensors; and a monitoring system for receiving output signals of said signal fetching circuit, said output signals being relevant to said signals generated by said position sensors such that displacement generated by the walking of the user on said platform main body is computed, and that results of computation is exhibited on a monitor.

2. The locomotion platform as defined in claim 1, wherein said position sensors are arranged in open ball sleeves.

3. The locomotion platform as defined in claim 1, wherein said position sensors are arranged in closed ball sleeves.

4. The locomotion platform as defined in claim 3, wherein said position sensors are composed of a large ball, a plurality of small steel balls, an insulated spindle, and a pad.

5. The locomotion platform as defined in claim 1, wherein said waist holding device is a rail-type waist holding device.

6. The locomotion platform as defined in claim 5, further comprises an angular displacement sensor.

7. The locomotive platform defined in claim 1 wherein said waist holding device provides the user with a force for enabling the user to maintain a steady motion on the platform.

8. The locomotion platform defined in claim 4 wherein said waist holding device provides the user with a force for enabling the user to maintain a steady motion on the platform.

9. The locomotion platform defined in claim 5 wherein said waist holding device provides the user with a force for enabling the user to maintain a steady motion on the platform.

10. The locomotion platform defined in claim 6 wherein said waist holding device provides the user with a force for enabling the user to maintain a steady motion on the platform.

* * * * *